(12) United States Patent
Williams et al.

(10) Patent No.: US 6,401,142 B1
(45) Date of Patent: Jun. 4, 2002

(54) APPARATUS AND METHOD FOR SELECTIVE BUS TRANSFER USING MASTER AND SLAVE MODES

(75) Inventors: Robert Alan Williams, Cupertino; Autumn Jane Niu, Sunnyvale, both of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/317,258

(22) Filed: May 24, 1999

(51) Int. Cl.$^7$ ................................................ G06F 3/00
(52) U.S. Cl. ................ 710/14; 710/5; 710/58; 710/129; 709/209
(58) Field of Search ............................. 710/14, 5, 129, 710/33, 36, 65, 20, 24, 58, 61, 126; 709/209, 211, 33, 36, 65, 208; 370/16; 345/126, 121

(56) References Cited

U.S. PATENT DOCUMENTS

| | | | | |
|---|---|---|---|---|
| 5,488,606 A | * | 1/1996 | Kakuma et al. | 370/16 |
| 5,878,217 A | * | 3/1999 | Cherukuri | 709/212 |
| 5,935,249 A | * | 8/1999 | Stern et al. | 713/201 |
| 6,012,105 A | * | 1/2000 | Rubbmark et al. | 710/14 |
| 6,021,453 A | * | 2/2000 | Klingman | 710/129 |
| 6,047,001 A | * | 4/2000 | Kuo et al. | 370/428 |
| 6,161,160 A | * | 12/2000 | Niu et al. | 710/129 |
| 6,247,089 B1 | * | 6/2001 | Kuo et al. | 710/129 |
| 6,279,044 B1 | * | 8/2001 | Niu et al. | 710/5 |

* cited by examiner

Primary Examiner—Jeffrey Gaffin
Assistant Examiner—Rijue Mai

(57) ABSTRACT

A network interface for a workstation is configured to supply data to a host bus. A bus interface unit is configured to output the data frame onto the host bus based on a master or slave transfer request to access the buffer memory. The slave request to access the buffer memory may be in the form of either an I/O mapped or memory mapped request. A memory management unit includes request logic to receive the master and slave transfer requests and to generate a generic request to access the buffer memory. The memory management unit is configured to transfer the data frame between the buffer memory and the host bus in response to the generic request. The memory management unit effectively accesses stored data independent from the type of data transfer mode. Notably, the modes of data transfer, master or slave, can be changed within the transfer of a single frame, on a per-byte basis.

17 Claims, 9 Drawing Sheets

APPARATUS AND METHOD FOR SELECTIVE BUS TRANSFER USING MASTER AND SLAVE MODES

BACKGROUND OF THE INVENTION

1. Technical Field

The present invention relates to data transfer and more particularly, to methods and systems for transferring data between a buffer memory and a host bus.

2. Background Art

Network interface devices are commonly used to transmit data between a host computer and network communication systems, such as a local area network. Typical network interface devices include Ethernet-type and IEEE 802.3. One primary function of a network interface is to control the transfer of data between a buffer and the host bus.

The data stored in the buffer is retrieved as a result of one of two types of requests, namely master and slave. Generally in master mode, a transfer is initiated by a master device, which must arbitrate for use of the host bus with a host CPU prior to retrieving the data. In slave mode, the host CPU controls access of the buffer and retrieval of data. A slave access can be performed using two different types of mapping: memory mapping and Input/Output (I/O) mapping.

Traditionally, transfer of data between the buffer memory and the host bus has been accomplished by providing specific logic for each type of request. FIG. 8 is a block diagram illustrating a typical buffer architecture 200 for accessing data from buffer memory. An interface unit 202 receives master and slave requests to access the buffer memory 204. The request is directed to a transfer logic 206 that transfers data to or from the buffer memory 204. The transfer logic 206 must be capable of handling each type of request individually. Thus, the interface unit 202 transfers the request to a specific logic portion in the transfer logic 206 based on the nature of the request. For example, the transfer logic 206 includes a first logic circuit 208 that services a master request, a second logic circuit 210 that services an I/O mapped slave request, and a third logic circuit 212 that services memory mapped slave requests. Furthermore, after a data transfer mode has been determined according to the request, the mode cannot be changed during the transmission of the frame.

In a conventional system, once a data transfer has been initiated, the mode of transfer (e.g., master, slave I/O mapped, slave memory mapped) cannot be altered within the transmission of a data frame. That is, a master transfer request triggers a data transfer in master transfer mode in which data transmission proceeds in this mode until complete transfer of the frame or termination of the session occurs.

Hence, a primary disadvantage associated with current methods of transferring data is that the mode of transfer can not be changed during data transmission to adapt to the needs of the application (e.g., protocols, drivers) or to changes in the availability of computing resources. Another disadvantage is the excessive amount of logic necessary to service the different types of requests. Yet another disadvantage is the increased latency encountered during the data transfer process. This latency can be defined as the delay between the time when data is available in the buffer to the time it is delivered to the host bus. Additional delays are encountered during transfers initiated by a master device, because, as previously mentioned, the master device must arbitrate for access to the bus with other master devices that also require use of the bus.

DISCLOSURE OF THE INVENTION

There is a need for an arrangement for supplying data frames to a host bus that is capable of changing the type of data transfer mode within the transmission of a data frame.

There is also a need for an arrangement for supplying data frames to a host bus that minimizes the logic necessary to access a buffer memory using different types of requests.

There is also a need for an arrangement for supplying data frames to a host bus that minimizes the latency encountered during the transfer of data from a buffer memory.

These and other needs are attained by the present invention, where master and slave accesses to the buffer are serviced by a single logic circuit that permits the data transfer modes to be changeable, eliminates the need for arbitration, and reduces the amount of latency encountered during the data transfer process.

In accordance with one aspect of the present invention, a network interface for supplying data frames to and from a host bus comprises a buffer memory for storing a data frame. A bus interface unit is configured for outputting the data frames onto the host bus according to a master transfer mode and a slave transfer mode. Request logic generates a generic request to access the buffer memory in response to receipt of either a master transfer request or a slave transfer request. A memory management unit is configured for transferring the data frame between the buffer memory and the host bus in response to the generic request. The master transfer mode is changeable to the slave transfer mode and vice versa during the outputting of a data frame onto the host bus. Hence, the network interface can alternately transfer data in a master transfer mode or a slave transfer mode and vice versa within a single frame, thereby permitting flexibility in the allocation of computing resources and optimizing the performance of applications.

Another aspect of the present invention provides a network interface device for storing frame data. A request logic unit is configured for generating a generic request to access the buffer memory in response to receipt of either a detected master transfer request or a slave transfer request. A bus side control logic unit is configured for determining a mode of data transfer based upon detection of the master transfer request or a slave transfer request; the mode is a master transfer mode if the master transfer request is received or a slave transfer mode if the slave transfer request is received. A memory management unit is configured for transferring the stored frame data from the buffer memory in response to the generic request to the host bus. The mode of data transfer is changeable during the transfer of the stored frame data. Under this arrangement, efficiency of computing resource usage can be realized with the ability to change data transfer mode within the transfer of frame data within a single data frame.

Yet another aspect of the invention provides a method for transferring a data frame between a buffer memory and a host bus. The method comprises receiving a master transfer request or a slave transfer request wherein the master transfer request indicates a master transfer mode and the slave transfer request indicates a slave transfer mode, changing the master transfer mode to the slave transfer mode and vice versa, generating a generic request in response to the receiving step, and transferring the data frame between the buffer memory and the host bus in response to the generic request. Therefore, the modes of data transfer can be readily changed from master to slave (I/O mapped or memory mapped) and vice versa to accommodate requirements of the applications.

Additional advantages, and novel features of the present invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

DETAILED DESCRIPTION OF THE INVENTION

The present invention is directed to the ability of a network interface to switch between master transfers and slave transfers. A description of the invention will be given with the example of a network interface in a packet switched network, such as an Ethernet (IEEE 802.3) network. A description will first be given of a network interface architecture, followed by the arrangement for transferring data between a buffer memory to a system memory using a single logic circuit configured for responding to master requests and slave requests whereby the data transfer modes (e.g., master, slave I/O mapped, and slave memory mapped) are changeable during transfer of a data frame. It will become apparent, however, that the present invention is also applicable to other peripheral interface devices especially those used in frame based data communication systems (e.g., token ring, fiber distributed data interface (FDDI)).

NETWORK INTERFACE ARCHITECTURE

Figure 1A:
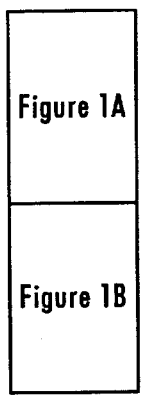
FIGS. 1A and 1B are block diagrams illustrating a network interface for supplying data frames from a buffer memory to a host bus according to an embodiment of the present invention.
Figure 1A:
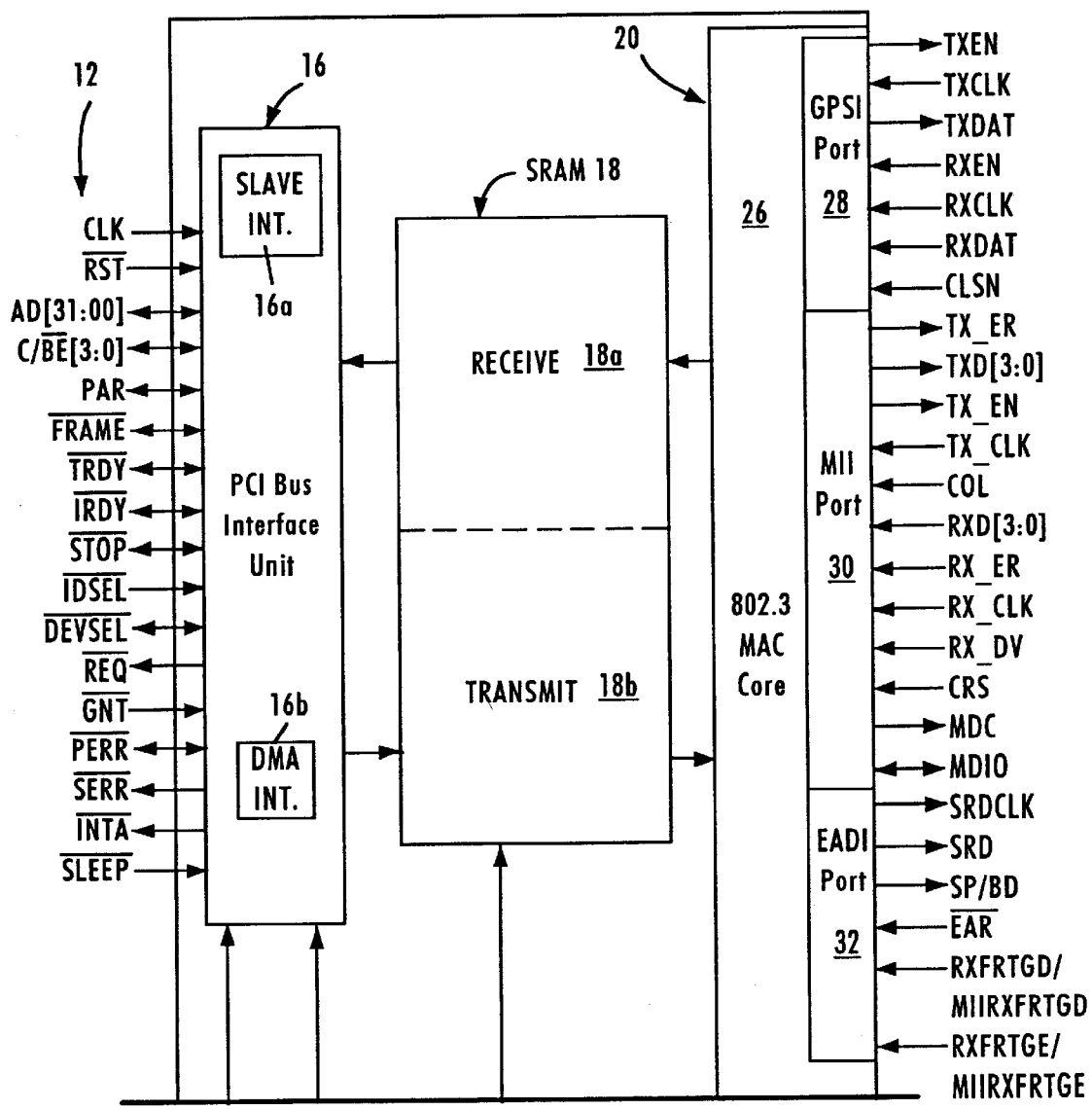
Figure 1B:
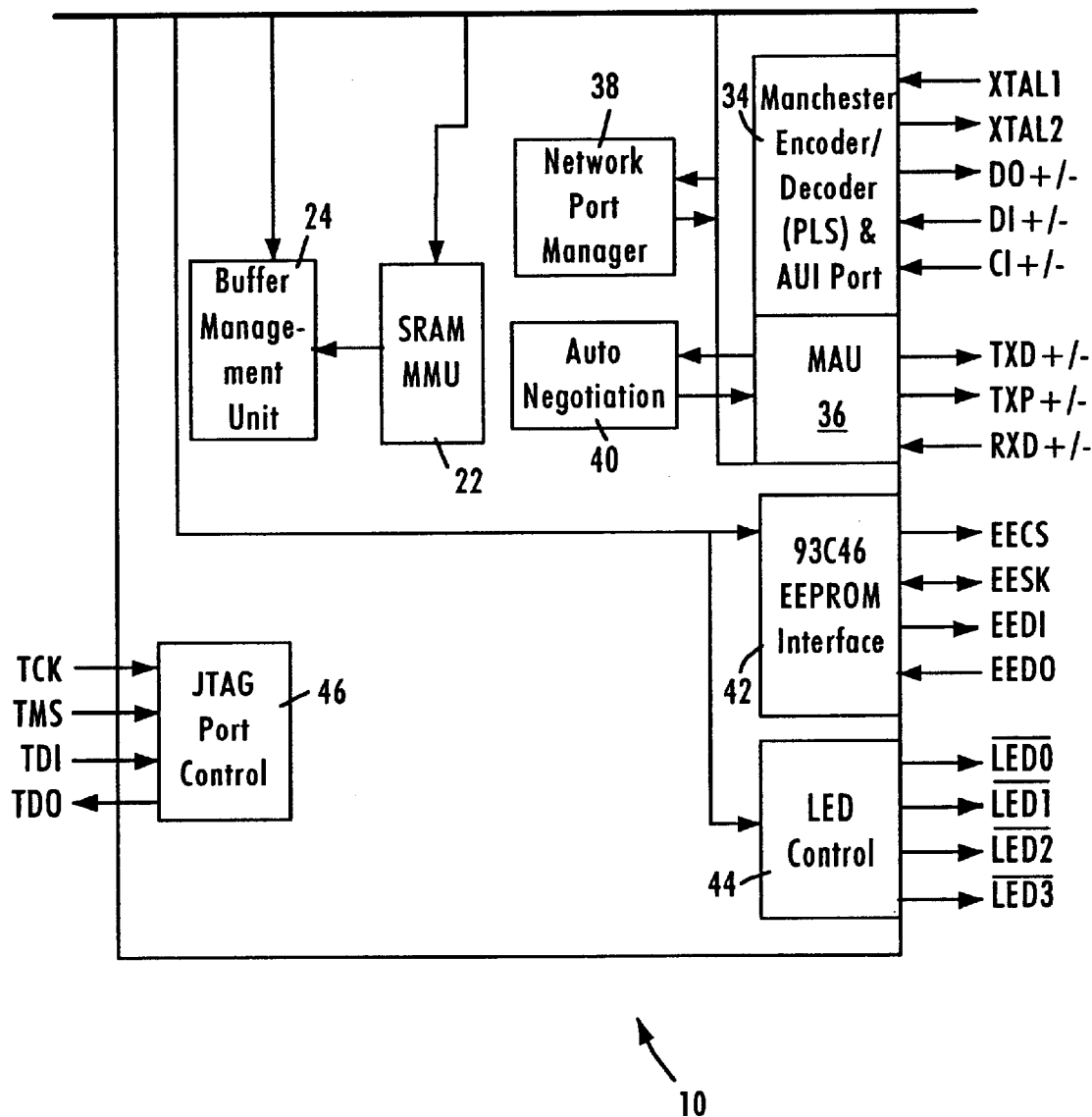

FIGS. 1A and 1B are block diagrams of an exemplary network interface 10 that accesses the media of an Ethernet (IEEE 802.3) network according to an embodiment of the present invention. The network interface 10, preferably a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface portion 20. The PCI bus interface unit 16 includes a PCI slave interface 16a and a direct memory access (DMA) interface 16b. The slave interface 16a manages PCI control and status information including reading and programming of the PCI status registers, but may also be configured for managing slave transfers via the PCI bus with a host CPU. The DMA interface 16b manages DMA transfers by the network interface 10 to and from system memory. That is, slave transfers occur between the system memory and the network interface 10 via the PCI bus under the direct control of the host CPU. Hence, the PCI bus interface unit 16 can be selectively configured for PCI transfers in slave and/or master (e.g., DMA) mode.

The memory portion 18 includes a 32 bit wide static random access memory (SRAM) implemented directly on the network interface chip 10. According to the disclosed embodiment, the SRAM 18 may be accessed in a random access manner under the control of a memory management unit 22, or may be segmented into a receive portion 18a and a transmit portion 18b for receive and transmit paths, respectively.

The network interface 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory management unit 22 are shown as discrete components, the two units may be integrated to form a memory management unit (MMU) 52 controlling all transfers of data to and from the memory unit 18, as seen with additional reference to FIG. 2.

The network interface 10 includes a media access control (MAC) core 26, a general purpose serial interface (GPSI) 28, a media independent interface (MII) 30 for connecting to external 10 Mbps or 100 Mbps physical (PHY) transceivers, an external address detection interface (EADI) 32, an attachment unit interface (AUI) 34 having a Manchester encoder and decoder, and a 10/100 Mbps twisted pair transceiver media attachment unit (MAU) 36.

The network interface 10 also includes a network port manager 38 configured for performing MII handshaking between two devices on an MII bus via the MII port 30. Such MII handshaking may include link information, programming information at the MII layer using a management data clock (MDC), and management data input/output (MDIO) paths. The auto-negotiation portion 40 performs IEEE-compliant negotiation with a link partner on the PHY layer to exchange data indicating whether the link partner is capable of operating at 10 Mbps, 100 Mbps, and whether the link should be half-duplex or full-duplex.

The LED controller 44 selectively controls the generation of LED output signals based upon the internal decoding logic and network interface status registers (not shown). The network interface also includes an IEEE 1149.1-compliant JTAG boundary scan test access port interface 36.

The EEPROM interface 42 connects to an EEPROM on either a network interface adapter card or the motherboard of the host computer via a serial interface link. The EEPROM (not shown in FIGS. 1A or 1B) will be programmed with configuration information related to the network interface 10, enabling the network interface 10 to be configured during initialization via the EEPROM interface 42.

MEMORY MANAGEMENT ARCHITECTURE

Figure 2:
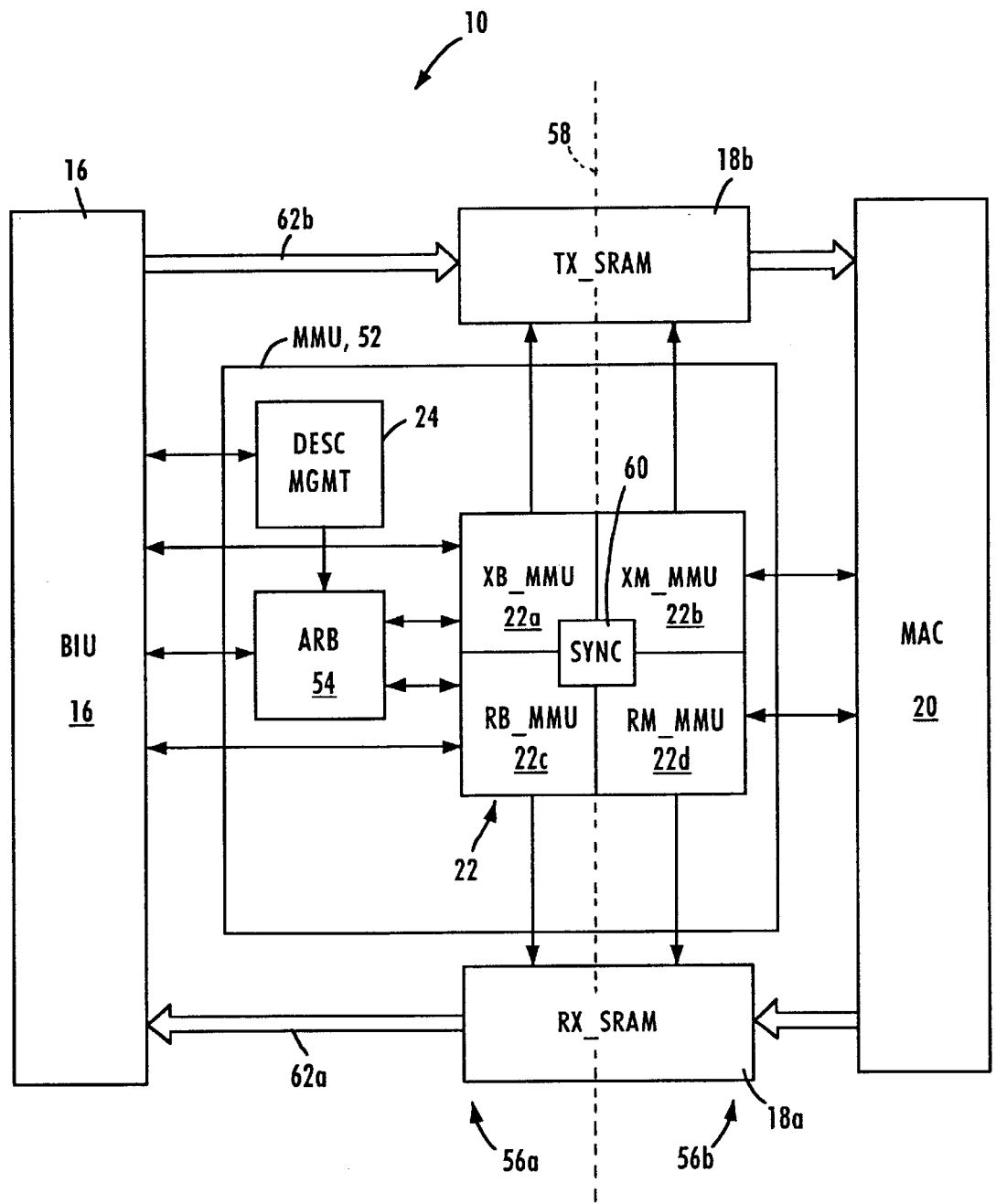
FIG. 2 is a block diagram illustrating the buffer architecture of the network interface of FIGS. 1A and 1B according to an embodiment of the present invention.

FIG. 2 is a block diagram illustrating the buffer architecture of the network interface 10 according to an embodiment of the present invention. As shown in FIG. 2, transfer of data frames between the PCI bus interface unit 16, also referred to as the bus interface unit (BIU), and the MAC 20 is controlled by a memory management unit (MMU) 52 including the buffer management unit 24 and the SRAM MMU 22 of FIG. 1B. The memory management unit 52 controls the reading and writing of data to the SRAM 18, illustrated in FIG. 2 as a receive SRAM portion 18a and a transmit SRAM portion 18b for convenience. It will be recognized in the art that the receive SRAM (RX_SRAM) 18a and the transmit SRAM (TX_XRAM) 18b may be implemented as a single memory device, or alternatively as two separate SRAM devices.

As shown in FIG. 2, the memory management unit includes the buffer management unit 24, also referred to as the descriptor management unit (DESCMGMT), the SRAM MMU 22, and an arbitration unit 54. The arbitration unit 54 arbitrates DMA requests for data transmission, data reception, descriptor lists from the descriptor management block 24, and status.

The SRAM MMU 22 includes separate controllers for each SRAM 18a and 18b, for both read and write operations. According to the disclosed embodiment, the network interface 10 operates in two generic clock domains, namely a host computer bus clock domain 56a, and a network clock domain 56b. Since the network interface 10 needs to send and receive data across two independent clock domains 56, divided by the dotted line 58, the SRAM MMU 22 must be capable of reading and writing data to each SRAM 18a and 18b in a manner that tracks memory status independent of the PCI clock in the host computer domain and the MAC clock generated from network activity in the network domain 56b.

According to the disclosed embodiment, the SRAM MMU includes a transmit-data bus-side memory management unit (XB_MMU) 22a, a transmit-data MAC-side memory management unit (XM_MMU) 22b, a receive-data bus-side memory management unit (RB_MMU) 22c, a receive-data MAC-side memory management unit (RM_MMU) 22d, and a synchronization circuit 60. The XB_MMU 22a and the RM_MMU 22d operate as write controllers configured for writing frame data into the SRAMs 18b and 18a, respectively. The XB_MMU 22a and the RB_MMU 22c operate according to the PCI bus clock (CLK). The RM_MMU 22d operates according to the receive MAC clock (RX_CLK) received by the MAC 20, and the XM_MMU 22b operates under the control of the MAC transmit clock (TX_CLK) received by the MAC 20. The XM_MMU 22b and the RB_MMU 22c operate as read controllers configured for reading frame data from the SRAMs 18b and 18a, respectively. Hence, receive data from the MAC 20 is written into the RX_XRAM 18a under the control of the write controller 22d synchronous to the receive clock (RX_CLK) in the network clock domain 56b. Frame data stored in the RX_XRAM 18a is read and output to the BIU 16 via data path 62a under the control of the receive-data read controller 22c, which reads the frame synchronous to the PCI bus clock signal.

Similarly, transmit data to be output onto the network by the MAC 20 is written into the TX_XRAM 18b via data path 62b under the control of the transmit-data write controller 22a, configured for writing the frame data synchronized to the PCI bus clock (CLK). The stored transmit data is read and output from the TX_XRAM 18b to the MAC 20 under the control of the transmit-data read controller 22b according to the MAC transmit clock (TX_CLK) within the network clock domain 56b.

The presence of two separate clock domains 56a and 56b in writing and reading to a random access memory 18 requires that the write controller and read controller devices be coordinated and synchronized to ensure that no contention issues arise due to the relative independence of the two clock domains 56a and 56b. The SRAM MMU 22 includes a synchronization circuit 60 that asynchronously monitors the status of the RX_XRAM 18a and the TX_XRAM I 8b, enabling the memory controllers to read and write to the memory 18 between the two clock domains 56a and 56b. Thus, problems that would ordinarily arise between the two clock domains in the individual memory management units 22a, 22b, 22c and 22d are avoided by use of the synchronization circuit 60 according to a prescribed arbitration logic.

SRAM DATA STRUCTURE

Figure 3A:
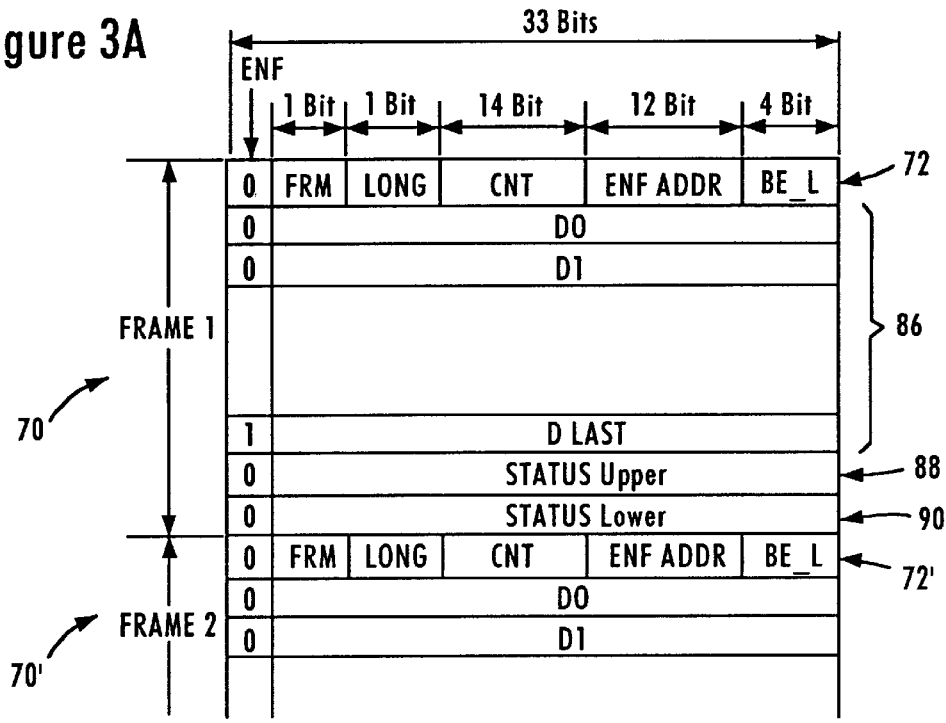
FIGS. 3A and 3B are diagrams illustrating an embodiment of the buffer memory structure of FIG. 2.
Figure 3B:
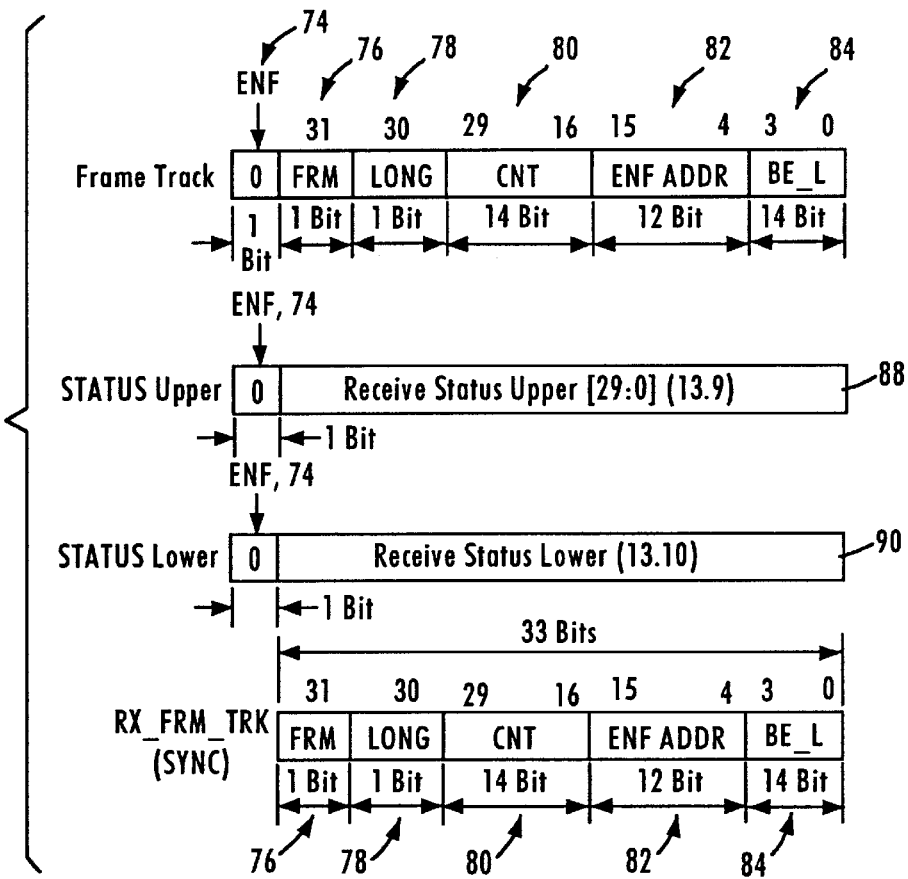

FIGS. 3A and 3B illustrate the structure of data frames 70, 70' stored in the SRAM 18. In the exemplary embodiment, each data frame 70 is 33 bits wide, 1 bit corresponding to an ENF parameter 74 and a 32 bit double word (DWORD) corresponding to data or control information. The various types of DWORDs in the data frame 70, include a frame track 72, frame data 86, an upper status 88, and a lower status 90. The frame track 72 functions as a header for the frame 70 and includes a FRM parameter 76, a LONG parameter 78, a CNT parameter 80, an ENF_ADDR parameter 82, and a BE_L parameter 84. The FRM parameter 76 is a 1 bit parameter that, when set to 1, indicates the entire received frame 70 stored in the SRAM 18 is valid. The LONG parameter 78 is a 1 bit parameter that, when set to 1, indicates the expected receive frame length is greater than a preset length. The CNT 80 parameter is a 14 bit byte count that indicates the total number of bytes in the receive frame 70. The ENF_ADDR parameter 82 is a 12 bit parameter that indicates the end address of the frame 70. The CNT parameter 80 and the ENF_ADDR parameter 82 are only valid when the FRM bit 76 is set to 1. The BE_L parameter 84 is a 4 bit active low parameter used to indicate which bytes are valid in the last DWORD (D LAST) of the frame 70. The ENF bit 74 is set to 1 to identify the final data segment 86 in the frame 70, and set to 0 for all other DWORDs. The upper status and lower status DWORDs 88, 90 provide control information, such as the total number of bytes of receive data in the frame, necessary to perform slave transactions.

PCI BUS DATA TRANSFERS

The three transfer modes, which include master, slave I/O mapped, and slave memory mapped, are different methods of accessing the SRAM for both transmit and receive paths. The objective is to permit a change of any one of these access methods within a single frame. This arrangement is achieved by the bus side control block 102 (FIG. 4) isolating the mechanics of the access of the SRAM from the type of transfer request. In effect, the RB_MMU 22c (and/or the XB_MMU 22a) is unaware of which type of access is requested, behaving independent of the types of transfer request. This independence facilitates the switching between the types of transfer modes during frame transmission. The transfer operations discussed below conceptually involves data frames; however, the term data frame is intended to encompass information about the date frame. Such information (or frame data) may be a part of the data frame itself (e.g., parameters from the frame header) or derived from the data frame. Furthermore, the present invention is described with respect to a network interface. It will become apparent, however, that the present invention is also applicable generally to peripheral devices that transfer data in bursts.

Figure 4:
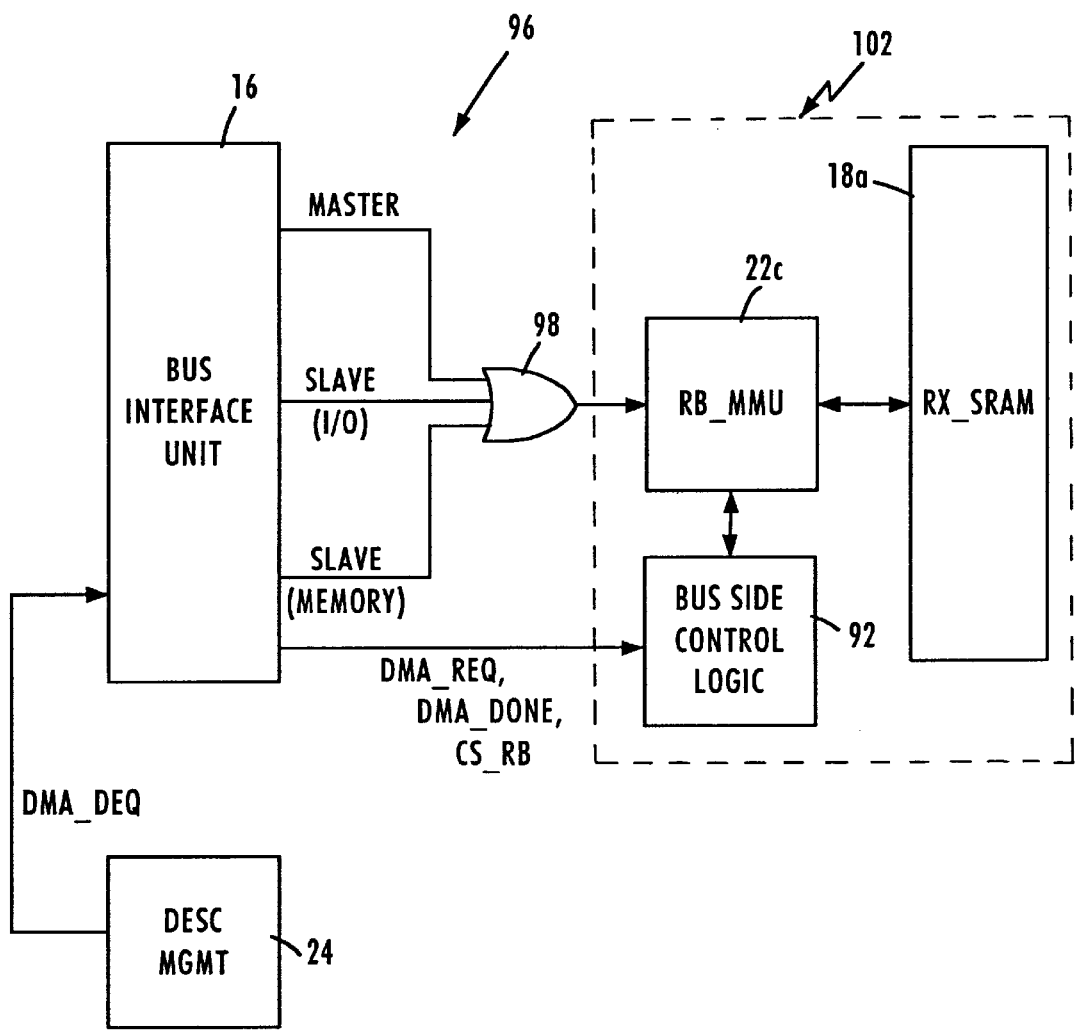
FIG. 4 is block diagram illustrating a request logic for generating generic requests according to an embodiment of the present invention and a bus side control logic for determining the mode of data transfer.

FIG. 4 is a block diagram illustrating request logic 96 for generating generic transfer requests according to an embodiment of the present invention. The request logic 96, which provides the capability of changing the types of data transfer modes, is implemented in the exemplary embodiment as an OR gate 98. The OR gate 98 receives different types of requests from the bus interface unit 16 and generates a generic request which is output to the read controller 22c (RB_MMU) in order to access the buffer memory 18a. The bus interface unit (BIU) 16 is configured for outputting the different types of requests to access the buffer memory 18a through request logic 96. The requests can be in the form of master or slave, corresponding to the respective data transfer modes. The slave requests can be either I/O mapped or memory mapped. Further, the types of data transfer modes can be altered on a per byte basis—i.e., within a single data frame.

Within the bus side control block 102, the bus side control logic 92 determines the type of transfer mode by examining the DMA_REQ, DMA_DONE, and CS_RB signals, which are explained later in more detail with respect to FIGS. 6 and 7. The DESC MGMT 24, as illustrated in FIG. 4, supplies the DMA_REQ to the BIU 16 to initiate a master mode data transfer. In addition to providing the bus side control logic 92 with the DMA_REQ signal, the BIU 16 also transmits a DMA_DONE signal to the bus side control logic 92 indicating an end to the DMA transfer. For slave mode, the bus side control logic 92 detects a CS_RB signal assertion. It should be noted that FIG. 4 is merely illustrative of data transfer on the receive path. The present invention also applies to data transfers on the transmit path; i.e., the bus side control block encompasses the XB_MMU. The ability to modify data transfer modes as described above has fostered development of various applications to increase the efficiency of the network interface device.

One such application involves the implementation of a "look-ahead" buffer, which is allocated for header information from the arriving frame (in case of reception). The look-ahead buffer is a partitioned section of system memory. A descriptor (which is used for programming the DMA) can be created for this buffer. The DESC MGMT 24 reads the descriptor and finds the size and location of the buffer. When a frame arrives, the DESC MGMT 24 will fill the buffers with the data coming in on the line as long as there are receive descriptors available in system memory. For example, if there is only one descriptor left in system memory, the DESC MGMT 24 will stop; the processor can examine the headers of the buffer and decide to which application (e.g., protocol stack) the rest of the data should be sent. At this time, another descriptor can be created to instruct the DESC MGMT 24 to copy the rest of the frame to host memory or it can choose to use programmed I/O instructions to move data from the buffer to host memory—criteria such as frame size can be used; if there is little left of the frame, programmed I/O would be quicker. Alternatively, upon arrival of the frame, the CPU can examine the headers using programmed I/O then decide to program the DESC MGMT 24 to get the rest of the frame.

For the transfers on the transmit path, the CPU can decide to use DMA or programmed I/O based on the number of buffers allocated for the data and size of these buffers. For example, programmed I/O can be used to transfer header info from one buffer, while the DESC MGMT 24 can be used to transfer the rest of the frame data from another buffer.

Figure 5:
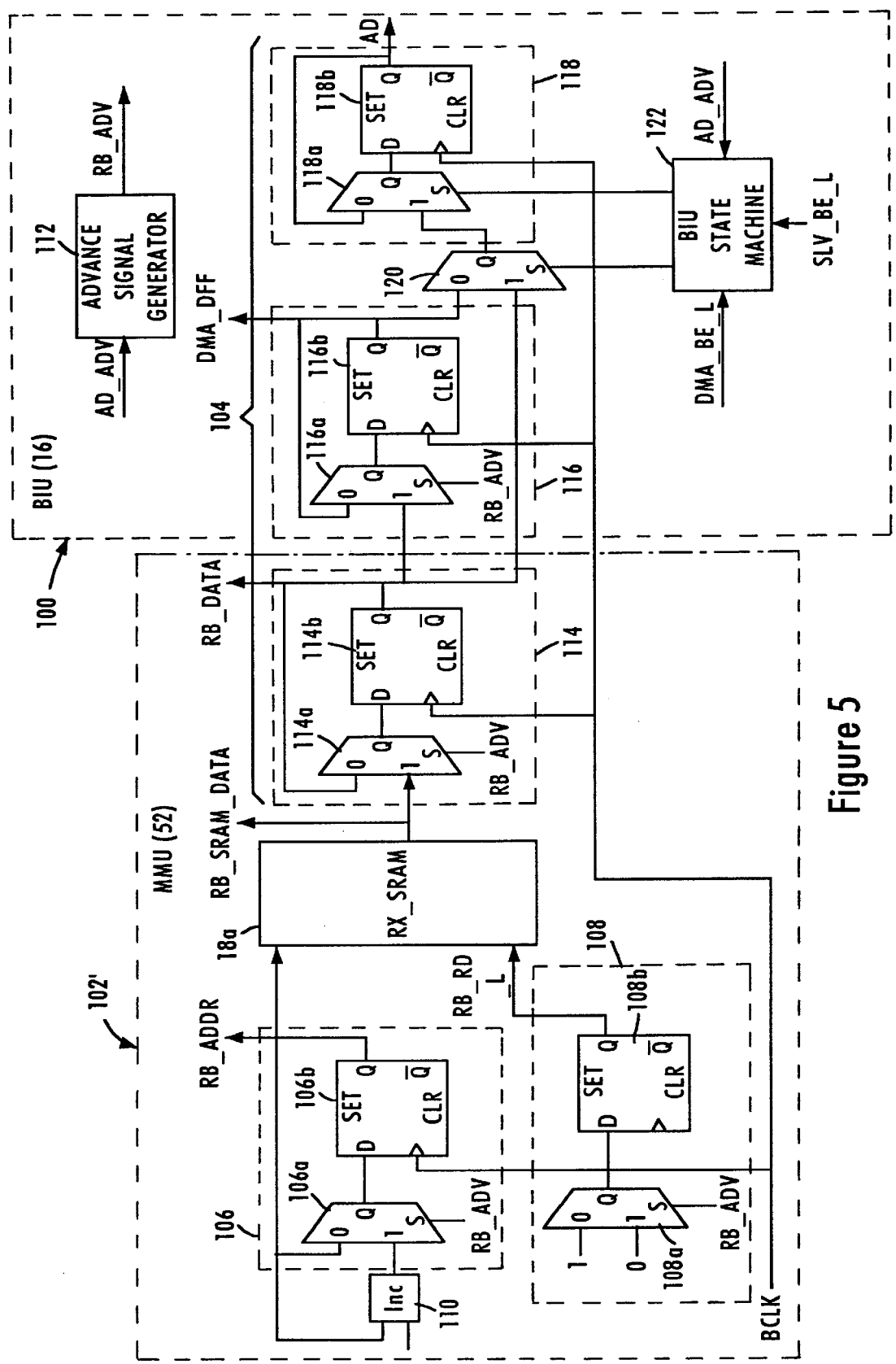
FIG. 5 is a block diagram illustrating circuitry configured for data transfer from the buffer memory of FIG. 2 according to an embodiment of the present invention.

FIG. 5 is a diagram illustrating a logic circuit 100 for the transfer of data from the SRAM 18a to the BIU 16 according to an embodiment of the present invention. The logic circuit 100 includes a bus side control block 102' for reading stored frame data from the SRAM 18a, and a byte packing circuit 104 for aligning portions of the frame data prior to transfer to the host bus (e.g., the PCI bus 12). The bus side control block 102' includes an address register 106, a read line control register 108, an increment circuit 110, and an advance signal generator 112. The address register 106 stores an address pointer value (RB_ADDR) that identifies a memory location in the SRAM 18a for reading a corresponding 32-bit double-word (DWORD) of frame data. Each bit of the address register 106 includes a multiplexer 106a and a delay flip flop 106b. The increment circuit 110 supplies an incremented address pointer value (RB_ADDR) which is stored in the address register 106. The address register 106 stores the address pointer value in response to a bus-side advance signal (RB_ADV) supplied to the selection input of multiplexer 106a. The advance signal generator 112 generates the bus-side advance signal (RB_ADV) in response to an advance signal (AD_ADV) generated by the BIU 16. A read control line register 108, which includes a multiplexer 108a and a delay flip-flop 108b, outputs an active-low read signal (RB_RD_L) to the RX_SRAM 18a in response to the bus-side advance signal (RB_ADV), causing the RX_SRAM 18a to output the stored DWORD from the location addressed by the address pointer value (RB_ADDR).

The byte packing circuit 104 includes a first holding register 114, a second holding register 116, and a third holding register 118. As shown in FIG. 5, for each bit of an SRAM word the first holding register 114 includes a multiplexer 114a that selectively outputs the output frame data received from the RB_SRAM_DATA signal path based on the bus-side advance signal (RB_ADV), and a delay flip flop 114b that latches the frame data at the rising edge of a clock signal (BCLK). For each bit the second holding register 116 also includes a multiplexer 116a which selectively outputs frame data received from the RB_DATA signal path based on the bus-side advance signal (RB_ADV), and a delay flip flop 116b. Similarly, the third holding register 118 includes a multiplexer 118a and a delay flip flop 118b for each bit.

SRAM 18a outputs the 32-bit DWORD of frame data to the first holding register 114 in response to the RBADDR and RB_RD_L signals. A 32-bit multiplexer 120 selectively supplies (on a bit-by-bit basis) the outputs of the first holding register 114 (via RB_DATA) or the second holding register 116 (via DMA_DFF), in response to a 32-bit selection signal from a BIU state machine 122, to the third holding register 118 where the data is held until it is ready for transfer onto the host bus 12 along the AD signal path. The advance signal (AD_ADV) generated by the BIU 16 indicates that frame data has been successfully transferred to the host bus 12 and that the BIU 16 is ready to accept new frame data. The advance signal (AD_ADV) generated by the BIU 16 drives an advance signal generator 112 to produce the bus-side advance signal (RB_ADV). The BIU state machine 122 receives various signals from the DMA descriptor management block 24, the RB_MMU 22c, and the BIU 16 which are used to generate the control signals output to multiplexer 120 and the multiplexer 118a. The signals include active low byte enable values for master transfers (DMA_BE_L), active low byte enable values for slave transfers (SLV_BE_L), and the advance signal (AD_ADV).

EXEMPLARY DMA TRANSFER

As described above, the network interface can switch between a master (DMA) transfer and a slave transfer during each transfer cycle.

Figure 6:
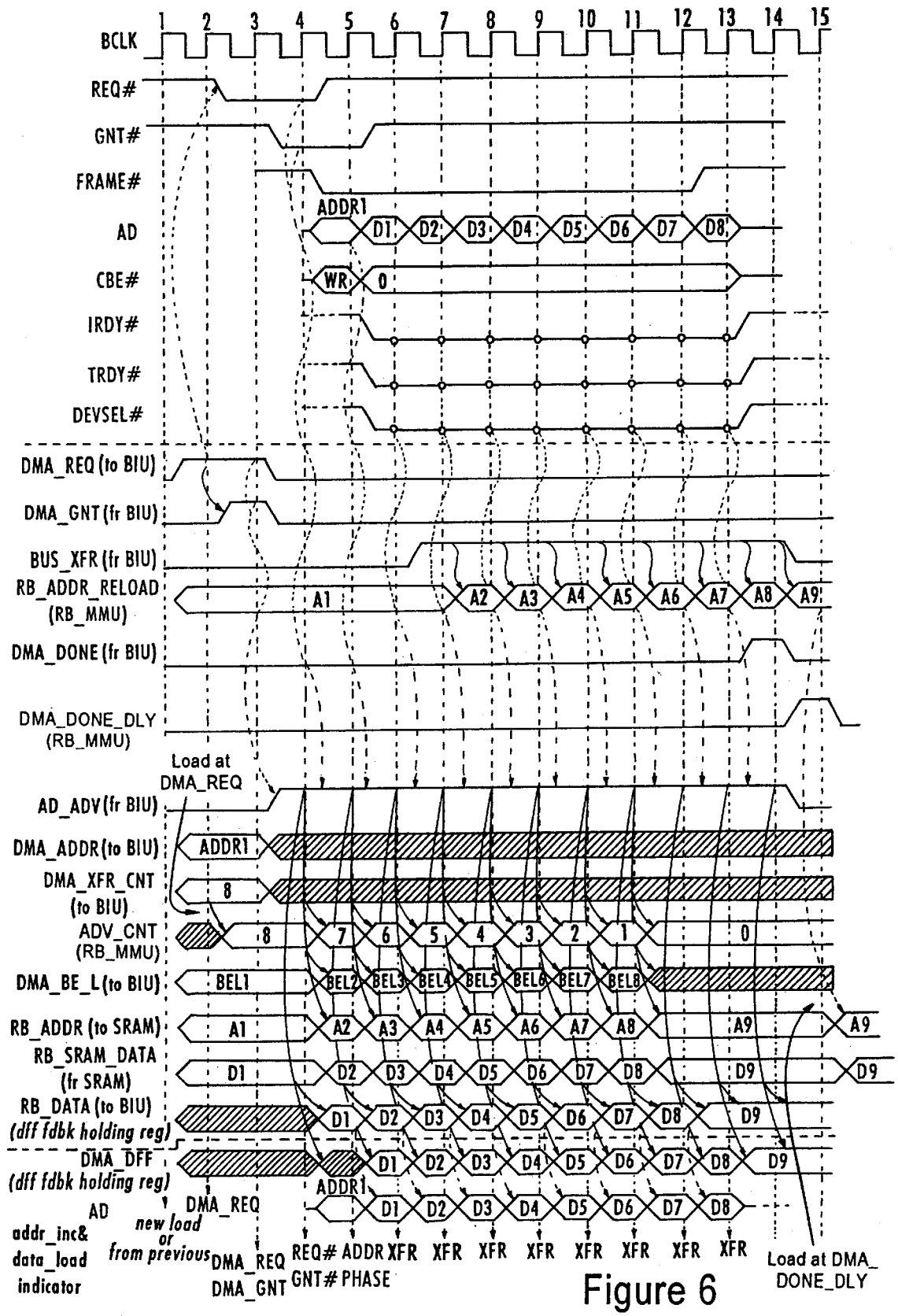
FIG. 6 is a timing diagram illustrating a master data transfer according to an embodiment of the present invention.

FIG. 6 is a timing diagram illustrating a master (DMA) transfer according to an embodiment of the present invention. The bus interface unit (BIU) 16 and the read controller 22c (RB_MMU) are both inactive at the start of clock cycle 1. At the start of clock cycle 2, the DMA descriptor management block 24 asserts DMA_REQ to request transfer of data to or from a host memory, and outputs a DMA address value (ADDR1) along signal path DMA_ADDR. The BIU 16 asserts an active low bus request signal (REQ#) on the host bus 12 and outputs an internal grant signal (DMA_GNT) to the descriptor management block 24 during clock cycle 2 in response to the DMA request signal (DMA_REQ). The DMA descriptor management block 24 also outputs a DMA count value (DMA_XFR_CNT) to the BIU 16 and the read controller 22c (RB_MMU) indicating the number of PCI data transfers to be completed during the transaction. As shown in FIG. 6, the DMA address (ADDR1) and the number of data transfers (DMA_XFR_CNT) are valid as long as the DMA_REQ remains asserted. The DMA descriptor management block 24 also outputs active low byte enable signals (DMA_BE_L), representing a value (BEL1) of valid bytes for the first data block, to the BIU 16 and read controller 22c (RB_MMU) during clock cycle 1. The SRAM 18a outputs the first block (D1) of data as a 32-bit double word (DWORD) to the first holding register 114 via the signal path RB_SRAM_DATA during clock cycle 1 in response to the corresponding address (RB_ADDR) output by the address register 106 and the read signal (RB_RD_L) output by the read control line register 108.

Assertion of DMA_REQ and DMA_GNT causes the BIU 16 to assert an advance signal (AD_ADV) during clock cycle 3, indicating that the BIU 16 is ready to transfer data. The advance signal (AD_ADV) drives the advance signal generator 112 used to produce the bus-side signal RB_ADV. As shown in FIG. 5, the bus-side advance signal (RB_ADV) controls the address register 106, the read control line register 108, the first holding register 114, and the second holding register 116. During clock cycle 3, the PCI arbiter (e.g. the host CPU) asserts GNT# in response to REQ#, thus granting ownership of the host bus 12 to the network interface 10 at the next cycle.

At the start of clock cycle 4, the network interface 10 asserts FRAME# on the host bus 12. The first data block, D1, is also output to the first holding register 114 from the SRAM along the RB_SRAM_DATA path at the start of clock cycle 4. The BIU 16 keeps AD_ADV asserted during clock cycle 4. Assertion of AD_ADV causes the count (ADV_CNT) to be decremented each clock cycle. In response to AD_ADV at clock cycle 4, a byte enable value (BEL2) for the second data block D2 is output to DMA_BE_L, and the value of read line pointer (RB_ADDR) in the address register 106 is incremented to the value A2. The first data block D1 is simultaneously transferred from the first holding register 114 to the second holding register 116 and to multiplexer 120 along the signal path RB_DATA, while the second data block, D2, is loaded into the first holding register 114 along the signal path RB_SRAM_DATA during clock cycle 4.

In the example of FIG. 6, the GNT# signal, which is an output from the host (CPU), is deasserted during clock cycle 5. The byte enable signal (BEL3) for the third data block D3 is output to DMA_BE_L. The third data block D3 is also output from the SRAM 18a via the RB_SRAM_DATA path to the first holding register 114, and the second data block D2 is output from the first holding register 114 to the second holding register 116 via signal path RB_DATA. The first data block, D1, is transferred to the third holding register 118 as a host bus (e.g., PCI) data block D'1 where it will be output to host bus 12 along the AD signal path.

The data blocks output by the SRAM 18a on the RB_SRAM_DATA path are aligned according to a first byte alignment. The PCI data blocks output to the host bus 12 by the third holding register 118 are aligned according to a second byte alignment. Consequently, the PCI data block D'1 may not be identical to the first data block D1 because the first data block, D1, must be properly aligned for output to the host bus 12 before it can be transferred to the system memory.

In order to properly align the data retrieved from the SRAM on the host bus, a byte enable value (BEL) is output by the descriptor management block 24 to the bus interface unit 16 for each data block. The BIU state machine 122 outputs byte selection signals to multiplexer 120 in response to byte enable values so that selected bytes (or bits) may be transferred to the third holding register 118. The first byte enable value, BEL1, specifies the number bytes from the first data block, D1, which may be transferred to the third holding register 118 for transfer to the host bus 12 along signal path AD. The second holding register 116 retains the value of the first data block, D1 so that the BIU state machine 122 can control the multiplexer 120 to output selected bytes of the first data block, D1, or the second data block, D2. Hence, the output of the second holding register 116 is shifted by multiplexer 120, so that the PCI data block D'1 output to the third holding register 118 will be properly aligned on the host bus. Accordingly, it should be understood that the BIU state machine 122 can control the multiplexer 120 for bit-wise or byte-wise manipulation of the data blocks. Alternatively, a plurality of 1 bit multiplexers, corresponding to the length of the data block in bits, may be substituted.

The network interface 10 and the target device respectively assert IRDY# and TRDY#, during clock cycle 5, to indicate readiness to complete transfer of the first PCI data block, D'1, to the host bus 12. Once transfer of the first PCI data block is complete, transfer of a second PCI data block D'2 may be initiated. During clock cycle 6, the DMA descriptor management block 24 outputs a byte enable value (BEL4) for the fourth data block, D4, along the signal path DMA_BE_L to the BIU state machine 122. The value for the read pointer (RB_ADDR) stored in the address register 106 also is incremented, and the fourth data block, D4, is output to the first holding register 114 via the RB_SRAM_DATA signal path. The third data block, D3, is output from the second holding register 116. The second byte enable value (BEL2) is used by the BIU state machine 122 to control multiplexer 120 for aligning data from the second data block, D2, with data from the first data block, D1, which was retained in the second holding register 116, and output the second PCI data block, D'2, to the host bus 12. The byte alignment process is repeated until all the data transfers are complete.

During clock cycle 6, the BIU 16 asserts an acknowledgement signal (BUS_XFR) which is output to the DMA descriptor management block 24 to indicate successful transmission of a PCI data block. The acknowledgement signal remains asserted throughout the entire data transfer process, clock cycle 7 to clock cycle 14. During clock cycle 12, the network interface 10 deasserts FRAME# high to indicate that it is ready to complete the data transfer phase and relinquish control of the host bus 12. At the start of clock cycle 14, the BIU 16 outputs a termination signal (DMA_DONE) to the RB_MMU indicating that the data transfer sequence is successfully completed. Similarly, the network interface 10 and the target device assert IRDY# and TRDY#, respectfully, to indicate the last transaction has occurred.

EXEMPLARY SLAVE TRANSFER

Figure 7:
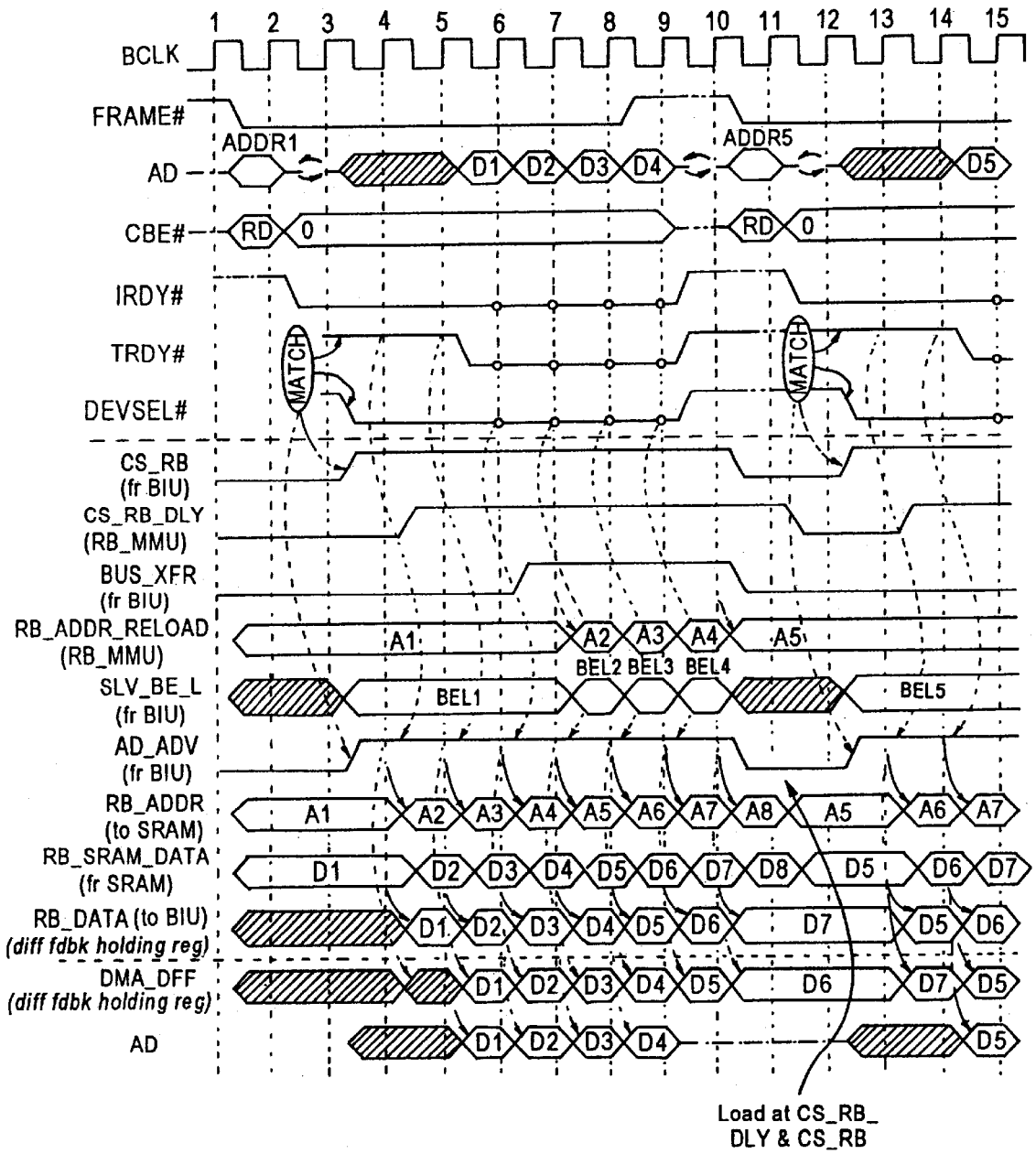
FIG. 7 is a timing diagram illustrating a slave transfer according to an embodiment of the present invention.
Figure 8:
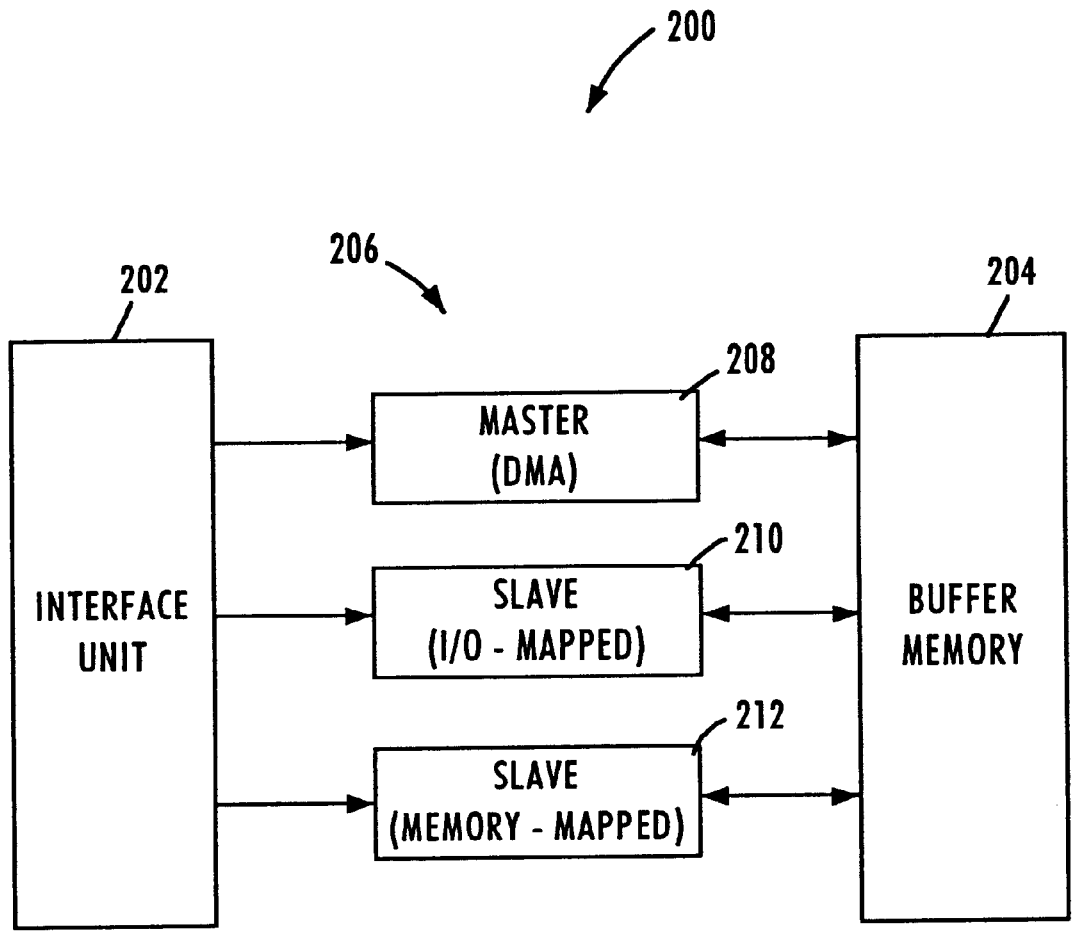
FIG. 8 is a block diagram illustrating a prior art buffer architecture for servicing requests to access a buffer memory.

FIG. 7 is a timing diagram illustrating a slave transfer according to an embodiment of the present invention. In response to the signals asserted by the host CPU, the read controller 22c (RB_MMU) outputs a value (A1) for the read pointer (RB_ADDR) to the address register 106. The SRAM 18a outputs a first data block, D1, to the first holding register 114 via the signal path RB_SRAM_DATA in response to the corresponding address (RB_ADDR) output by the address register 106 and the read signal (RB_RD_L) output by the read control line register 108. The value of the read pointer (RB_ADDR) in the address register 106 and the data in the first holding register 114 are valid for three clock cycles.

During clock cycle 2, the host CPU enters a wait state on the address signal path (AD), and outputs a byte enable signal along the command signal path (C/BE#) having a byte enable value, for example, of zero. The host CPU asserts IRDY# to indicate its readiness to commence the next data transfer. The slave device (e.g., the target network interface addressed by the host CPU) asserts DEVSEL# during clock cycle 3 in response to the starting address (ADDR1). The BIU 16 asserts an internal chip select CS_RB on the read controller 22c (RB_MMU) to indicate a slave read access from the SRAM 18a. The BIU 16 decodes the starting address (ADDR1) and outputs a byte enable signal (SLV_BE_L) to BIU state machine 122. The BIU 16 also asserts AD_ADV to indicate that it is ready to accept data.

During clock cycle 4, the second data block, D2, is output by the SRAM 18a to the first holding register 114 along the signal path RB_SRAM_DATA, and the first data block, D1, is concurrently transferred to the second holding register 116 and multiplexer 120 along the signal path RB_DATA in response to the advance signal (AD_ADV).

During clock cycle 5, the slave device deasserts TRDY# on the host bus 12 to indicate that it is ready to complete the current data phase. The third data block, D3, is loaded into the first holding register 114, and the second data block, D2, is transferred to the second holding register 116. The first data block, D1, is aligned for transfer onto the host bus 12 according to the byte aligning process previously described with reference to the BIU state machine 122.

During clock cycle 6, the BIU 16 asserts BUS_XFR to indicate successful transfer of the first PCI data block D'1, and the SRAM 18a outputs the fourth data block, D4, to the first holding register 114. The third data block, D3, is transferred from the first holding register 114 to the second holding register 116, and a second PCI data block, D'2, is output to the host bus 12. The data transfer process continues until clock cycle 9, at which point the fourth PCI data block D'4 has been output on the host bus 12.

During clock cycle 9, the host CPU deasserts IRDY# to halt the current data transfer. During clock cycle 10, the host CPU asserts FRAME# and outputs a new starting address (ADDR5) to the address path on the host bus 12 to continue the data transfer. The host CPU also outputs a read command (RD) along the command signal path (CBE#) of the host bus 12 to indicate a read transaction from the SRAM 18a. The BIU deasserts CS_RB and the advance signal (AD_ADV). During clock cycle 10, the slave device (e.g., the network interface) also continues reading data from the SRAM 18a. During clock cycle 11, the host CPU inserts a wait state into the address path of the host bus 12, and begins to load a byte enable value on the command signal path (CBE#). The host CPU deasserts IRDY# to indicate that it is ready to initiate data transfer.

The BIU 16 asserts DEVSEL# and CS_RB during clock cycle 12 in response to deassertion of IRDY# by the host CPU. The BIU 16 also asserts AD_ADV. During clock cycle 13, the sixth address for the read pointer is loaded into the address register 106, the sixth data block, D6, is read into the first holding register 114, and the fifth data block, D5, is transferred to the second holding register 116. During the fourteenth clock cycle the slave device asserts TRDY#, indicating that it is ready to receive data. The address for the read pointer (RB_ADDR ) in the address register 106 is incremented, and the seventh data block D7 is loaded into the first holding register 114. The sixth data block, D6, is transferred from the first holding register 114 to the second holding register 116. The fifth data block, D5, is manipulated and transferred to the host bus 12 as a fifth PCI data block, D'5, as previously described until the data transfer is completed.

As shown in FIGS. 5 and 7, slave accesses of the SRAM 18a are performed by retrieving the address from the AD signal path during the PCI address phase, followed by incrementing the read pointer value in the address register 106 based on the bus side advance signal (RB_ADV). Hence, the disclosed embodiment uses a generic logic configuration that can perform slave transfers independent of whether I/O mapped transfers or memory mapped transfers are used by the host CPU.

According to the disclosed embodiment, the data transfer mode can be altered during data transmission on a byte level basis through the use of a generic transfer logic that is configured for performing data transfers from a buffer memory to a host data bus, independent of whether the data transfer is a master access or a slave access. Further, the data transfer can be from the host data bus to the buffer memory. Hence, the generic transfer logic enables the network interface to switch between master transfers and slave transfers, providing maximum flexibility for the host computer.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A network interface for supplying a data frame to and from a host bus comprising:
   a buffer memory for storing the data frame;
   a bus interface unit for outputting the data frame onto the host bus according to a master transfer mode and a slave transfer mode;
   a request logic unit, receiving either a master transfer request or a slave transfer request and in response, the request logic unit generating a generic request to access the buffer memory; and
   a memory management unit for transferring the data frame between the buffer memory and the host bus in response to the generic request according to the master transfer mode or the slave transfer mode,
      wherein the master transfer mode is changeable to the slave transfer mode and vice versa during the outputting of the data frame onto the host bus.

2. The network interface of claim 1, wherein the memory management unit includes bus side control logic for controlling transfer of the data frame by determining whether the transfer of the data frame is in a master mode or a slave mode based upon the receipt by the request logic of either the master transfer request or the slave transfer request, respectively.

3. The network interface of claim 1, wherein the memory management unit includes logic for changing the transfer mode on a byte level basis.

4. The network interface of claim 1, wherein the memory management unit includes a descriptor management block that generates a master signal in response to the master transfer request.

5. The network interface of claim 4, wherein the master signal indicates the number of bytes to be transferred.

6. The network interface of claim 1, wherein the memory management unit comprises:
   a write controller unit for writing the data frame to the buffer memory; and
   a read controller for reading the data frame from the buffer memory,
   wherein the write controller and the read controller transparently operate with respect to the master transfer request and the slave transfer request.

7. The network interface of claim 1, wherein the slave mode is at least one of input/output mapped and memory mapped.

8. A network interface as in claim 1, wherein the request logic unit is an OR logic unit.

9. A network interface configured for supplying frame data between a buffer memory and a host bus comprising:
   a request logic unit configured to receive either a master transfer request or a slave transfer request and in response, the request logic unit generating a generic request to access the buffer memory;
   a bus side control logic unit configured for determining a mode of data transfer based upon the master transfer request and the slave transfer request, the mode being a master transfer mode if the master transfer request is received or a slave transfer mode if the slave transfer request is received; and
   a memory management unit configured for transferring the frame data between the buffer memory and the host bus in response to the generic request,
      wherein the mode of data transfer is changeable during the transfer of the frame data.

10. A network interface as in claim 9, wherein the memory management unit includes logic for changing the transfer mode on a byte level basis.

11. A network interface as in claim 9, wherein the request logic unit an OR logic unit.

12. A method for transferring a data frame between a buffer memory and a bus, the method comprising:
   receiving a master transfer request or a slave transfer request, the master transfer request indicating a master transfer mode and the slave transfer request indicating a slave transfer mode;
   changing the master transfer mode to the slave transfer mode and vice versa in response to receipt of a master transfer request when in the slave transfer mode, and a slave transfer request when in the master transfer mode;
   providing either a master transfer request or a slave transfer request to a logic unit and in response, the logic unit generating a generic request; and
   transferring the data frame between the buffer memory and the host bus in response to the generic request.

13. A method for transferring a data frame between a buffer memory and a bus, the method comprising:
   receiving a master transfer request or a slave transfer request, the master transfer request indicating a master transfer mode and the slave transfer request indicating a slave transfer mode;
   changing the master transfer mode to the slave transfer mode and vice versa in response to receipt of a master transfer request when in the slave transfer mode, and a slave transfer request when in the master transfer mode;
   generating a generic request in response to receipt of either a master transfer request or a slave transfer request;
   transferring the data frame between the buffer memory and the host bus in response to the generic request;
   generating a master signal in response to the receipt of the master transfer request, the master signal indicating the number of bytes to transfer;
   supplying the master signal to bus side control logic;
   detecting a slave signal in response to the receipt of the slave transfer request;
   supplying the slave signal to the bus side control logic; and
   determining a mode of transfer based upon the receipt of the master signal or the slave signal.

14. A method according to claim 12, wherein the changing step occurs during the transferring step.

15. A method according to claim 14, wherein the changing step is on a byte level basis.

16. A method according to claim 12, wherein the transferring step is transparent to both a write controller and a read controller.

17. A method according to claim 12, wherein the request logic unit is an OR logic unit.

* * * * *

UNITED STATES PATENT AND TRADEMARK OFFICE
CERTIFICATE OF CORRECTION

PATENT NO.   : 6,401,142 B1
DATED        : June 4, 2002
INVENTOR(S)  : Robert Alan Williams et al.

It is certified that error appears in the above-identified patent and that said Letters Patent is hereby corrected as shown below:

<u>Title page, Item [54], Column 1, lines 1-3,</u>
Change the title from "APPARATUS AND METHOD FOR SELECTIVE BUS TRANSFER USING MASTER AND SLAVE MODES" to -- APPARATUS AND METHOD FOR SUPPLYING DATA FRAMES TO A HOST BUS INCLUDING CHANGING TYPE OF TRANSFER MODE DURING TRANSMISSION OF A DATA FRAME --.

Signed and Sealed this

Fifteenth Day of October, 2002

Attest:

Attesting Officer

JAMES E. ROGAN
*Director of the United States Patent and Trademark Office*